(12) United States Patent
Ye et al.

(10) Patent No.: US 10,904,566 B2
(45) Date of Patent: Jan. 26, 2021

(54) METHOD AND APPARATUS FOR INDEX MAP CODING IN VIDEO AND IMAGE COMPRESSION

(71) Applicant: HFI Innovation Inc., Zhubei (TW)

(72) Inventors: Jing Ye, San Jose, CA (US); Tzu-Der Chuang, Zhubei (TW); Shan Liu, San Jose, CA (US); Yu-Chen Sun, Keelung (TW)

(73) Assignee: HFI Innovation Inc., Zhubei (TW)

( * ) Notice: Subject to any disclaimer, the term of this patent is extended or adjusted under 35 U.S.C. 154(b) by 75 days.

(21) Appl. No.: 15/556,667

(22) PCT Filed: Mar. 17, 2016

(86) PCT No.: PCT/CN2016/076627
§ 371 (c)(1),
(2) Date: Sep. 8, 2017

(87) PCT Pub. No.: WO2016/146076
PCT Pub. Date: Sep. 22, 2016

(65) Prior Publication Data
US 2018/0054629 A1     Feb. 22, 2018

Related U.S. Application Data

(60) Provisional application No. 62/134,655, filed on Mar. 18, 2015.

(51) Int. Cl.
*H04N 19/93* (2014.01)
*H04N 19/70* (2014.01)
(Continued)

(52) U.S. Cl.
CPC ......... *H04N 19/593* (2014.11); *H04N 19/157* (2014.11); *H04N 19/167* (2014.11);
(Continued)

(58) Field of Classification Search
None
See application file for complete search history.

(56) References Cited

U.S. PATENT DOCUMENTS

| 9,918,068 B2 | 3/2018 | Chang et al. | |
| 2014/0301475 A1* | 10/2014 | Guo | H04N 19/50 375/240.24 |
| 2019/0116380 A1 | 4/2019 | Chuang et al. | |

FOREIGN PATENT DOCUMENTS

| CN | 103621093 A | 3/2014 |
| CN | 104244007 A | 12/2014 |

(Continued)

OTHER PUBLICATIONS

Hsiang, S.T., et al.; "Further redundancy removal for coding palette index map;" Joint Collaborative Team on Video Coding (JCT-VC) of ITU-T SG 16 WP 3 and ISO/IEC JTC 1/SC 29/WG 11; Oct. 2015; pp. 1-4.

(Continued)

*Primary Examiner* — Mikhail Itskovich
(74) *Attorney, Agent, or Firm* — Oblon, McClelland, Maier & Neustadt, L.L.P.

(57) ABSTRACT

A method and apparatus of video coding using palette coding mode including run modes are disclosed. In one embodiment, the system determines a maximum palette run for a current pixel being coded based on coding information including block size of the current block, pixel location of the current pixel, and whether a last run type for the current block is the copy-index mode or the copy-above mode. The current run associated with the current pixel is then encoded into one or more binary strings or decoded from the bitstream according to the maximum palette run. A syntax element to indicate the last run type for the current block can be signaled or parsed from the bitstream.

6 Claims, 5 Drawing Sheets

(51) Int. Cl.
- *H04N 19/593* (2014.01)
- *H04N 19/182* (2014.01)
- *H04N 19/167* (2014.01)
- *H04N 19/157* (2014.01)
- *H04N 19/186* (2014.01)

(52) U.S. Cl.
CPC ......... *H04N 19/182* (2014.11); *H04N 19/186* (2014.11); *H04N 19/70* (2014.11); *H04N 19/93* (2014.11)

(56) References Cited

FOREIGN PATENT DOCUMENTS

| | | |
|---|---|---|
| CN | 107005717 A | 8/2017 |
| WO | WO 2014/165784 A1 | 10/2014 |
| WO | WO 2015/006169 A1 | 1/2015 |
| WO | 2016/074627 A1 | 5/2016 |

OTHER PUBLICATIONS

Joshi, R., et al.; "High Efficiency Video Coding (HEVC) Screen Content Coding: Draft 4;" Joint Collaborative Team on Video Coding (JCT-VC) of ITU-T SG 16 WP 3 and ISO/IEC JTC 1/SC 29/WG 11; Jun. 2015; pp. 1-56.

International Search Report dated Jun. 20, 2016, issued in application No. PCT/CN2016/076627.

Joshi, R., et al.; "Proposed Editorial Improvements to High Efficiency Video Coding (HEVC) Screen Content Coding: Draft 2;" JCTVC-T0031; Joint Collaborative Team on Video Coding (JCT-VC) of ITU-T SG 16 WP 3 and ISO/IEC JTC 1/SC 29/WG 11; Feb. 2015; pp. 1-366.

Pu, W.m, et al.; "CE1 Test B.1: Modified Palette Run Coding;" JCTVC-T0034; Joint Collaborative Team on Video Coding (JCT-VC) of ITU-T SG 16 WP 3 and ISO/IEC JTC 1/SC 29/WG 11; Feb. 2015; pp. 1-2.

Karczjwicz, M., et al.; "Non CE1: Grouping Palette Indices At Front" JCTVC-T0065r2; Joint Collaborative Team on Video Coding (JCT-VC) of ITU-T SG 16 WP 3 and ISO/IEC JTC 1/SC 29/WG 11; Feb. 2015; pp. 1-3.

Y-C. Sun, et al. CE1-related: Harmonization between JCTVCT0065 Non CE1: Grouping Palette Indices At Front and CE1 Test A.1.5. JCT-VC of ITU-T and ISO/IEC. JCTVC-T0233 Ver.2, Feb. 17, 2015, pp. 1-6.

R. Joshi, et al. High Efficiency Video Coding (HEVC) Screen Content Coding: Draft 2 JCT-VC of ITU-T and ISO-IEC. JCTVC-S1005 Ver.1, Dec. 10, 2014, pp. 1-350.

Korean Office Action dated Jan. 21, 2020 in Korean Patent Application No. 10-2017-7027814, with English translation.

* cited by examiner

*Fig. 2*

METHOD AND APPARATUS FOR INDEX MAP CODING IN VIDEO AND IMAGE COMPRESSION

CROSS REFERENCE TO RELATED APPLICATIONS

The present invention claims priority to U.S. Provisional Patent Application, Ser. No. 62/134,655, filed on Mar. 18, 2015. The U.S. Provisional Patent Application is hereby incorporated by reference in its entirety.

FIELD OF THE INVENTION

The present invention relates to video coding system using palette coding mode including run modes. In particular, the present invention relates to reducing the maximum run length for encoding a current pixel according to coding information related to the current block.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials. Related key color index coding techniques are briefly reviewed as follows.

Palette Coding

During the development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, A T, 25 Jul.-2 Aug. 2013 Document: JCTVC-N0247) and JCTVC-O0218 (Guo et al., "*Evaluation of Palette Mode Coding on HM-12.0+RExt-4.1*", Joint Collaborative Team on Video Coding (JCT-VC) of ITU-T SG 16 WP 3 and ISO/IEC JTC 1/SC 29/WG 11, 15th Meeting: Geneva, C H, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table (also called palette table) size is first transmitted followed by the palette elements (i.e., color values).
2. Transmission of pixel values: the pixels in the CU are encoded in a raster scan order. For each group of one or more pixels, a flag for a run-based mode is first transmitted to indicate whether the "copy index mode" or "copy above mode" is being used.
   2.1 "Copy index mode": In the copy index mode, a palette index is first signaled followed by "palette_run" (e.g., M) representing the run value. The term palette_run may also be referred as pixel_run in this disclosure. The run value indicates that a total of M samples are all coded using copy index mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.
   2.2 "Copy above mode": In the copy above mode, a value "copy_run" (e.g. N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

Both "copy index mode" and "copy above mode" are referred as copy modes for palette index coding in this disclosure. Besides, the palette mode is also referred to as palette coding mode in the following descriptions.

In JCTVC-N0247, palette of each component are constructed and transmitted. The palette can be predicted (shared) from its left neighboring CU to reduce the bitrate. In JCTVC-O0218, each element in the palette is a triplet, which represents a specific combination of the three color components. Furthermore, the predictive coding of palette across CU is removed.

Major-Color-Based (or Palette) Coding

Another palette coding technique similar to JCTVC-O0218 has also been disclosed. Instead of predicting the entire palette table from the left CU, individual palette color entry in a palette is predicted from the exact corresponding palette color entry in the above CU or left CU.

For transmission of pixel palette index values, a predictive coding method is applied on the indices as disclosed in JCTVC-O0182 (Guo et al., "*AHG8. Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, C H, 23 Oct.-1 Nov. 2013, Document: JCTVC-O0182). Three types of line modes, i.e., horizontal mode, vertical mode and normal mode are used for coding each index line. In the horizontal mode, all the indices in the same line have the same value. If the value is the same as the first pixel of the above pixel line, only line mode signaling bits are transmitted. Otherwise, the index value is also transmitted. In the vertical mode, it indicates that the current index line is the same with the above index line. Therefore, only line mode signaling bits are transmitted. In normal mode, indices in a line are predicted individually. For each index position, the left or above neighbors is used as a predictor, and the prediction symbol is transmitted to the decoder.

Furthermore, pixels are classified into major color pixels (with palette indices pointing to the palette colors) and escape pixel according to JCTVC-O0182. For major color pixels, the pixel value is reconstructed according to the major color index (i.e., palette index) and palette table in the decoder side. For escape pixel, the pixel value is further signaled in the bitstream.

Palette Table Signaling

In the reference software of screen content coding (SCC) standard, SCM-2.0 (Joshi et al., *Screen content coding test model* 2 (SCM 2), Joint Collaborative Team on Video Coding (JCT-VC) of ITU-T SG 16 WP 3 and ISO/IEC JTC 1/SC 29/WG 11, 18th Meeting: Sapporo, J P, July 2014, Document No.: JCTVC-R1014), an improved palette scheme is integrated in JCTVC-R0348 (Onno, et al., *Suggested combined software and text for run-based palette mode*, Joint Collaborative Team on Video Coding (JCT-VC) of ITU-T SG 16 WP 3 and ISO/IEC JTC 1/SC 29/WG 11, 18th Meeting: Sapporo, J P, July 2014, Document No.: JCTVC-R0348). The palette table of previous palette-coded CU is used as a predictor for current palette table coding. In palette table coding, the current palette table is signaled by choosing which palette colors in the previous coded palette table (palette predictor) are reused, or by transmitting new palette colors. The size of the current palette is set as the size of the predicted palette (i.e., numPredPreviousPalette) plus the size of the transmitted palette (i.e., num_signaled_palette_entries). The predicted palette is a palette derived from the previously reconstructed palette coded CUs. When coding the current CU as a palette mode, those palette colors that are not predicted using the predicted palette are directly transmitted in the bitstream (i.e., signaled entries).

An example of palette updating is shown as follows. In this example, the current CU is coded as palette mode with a palette size equal to six. Three of the six major colors are predicted from the palette predictor (numPredPreviousPalette=3) and three are directly transmitted through the bitstream. The transmitted three colors can be signaled using the exemplary syntax shown below.

```
num_signaled_palette_entries = 3
for( cIdx = 0; cIdx < 3; cIdx++ ) // signal colors for different components
    for( i = 0; i < num_signaled_palette_entries; i++ )
        palette_entries[ cIdx ][ numPredPreviousPalette + i ]
```

Since the palette size is six in this example, the palette indices from 0 to 5 are used to indicate the major color entries in the palette color table. The 3 predicted palette colors are represented with indices 0 to 2. Accordingly, three new palette entries are transmitted for indexes 3 through 5.

In SCM-2.0, if the wavefront parallel processing (WPP) is not applied, the palette predictor table is initialized (reset) at the beginning of each slice or at the beginning of each tile. If the WPP is applied, the last coded palette table is not only initialized (reset) at the beginning of each slice or at the beginning of each tile, but also initialized (reset) at the beginning of each CTU row.

Palette Index Map Coding in SCM-4.0

In the palette mode coding according to SCM-4.0 (Rosewarne et al., *High Efficiency Video Coding (HEVC) Test Model* 16 (*HM* 16) *Improved encoder description Update* 2, JCTVC-T1002, ITU-T SG16 WP3 and ISO/IEC JTC1/SC29/WG11, 20$^{th}$ Meeting: Geneva, C H, February 2015, Document: JCTVC-T1002), the palette indices are grouped and coded in front (i.e., before palette_run_mode and palette_run coding), and the escape pixels are coded at the end. The palette_run_mode and palette_run are coded between palette indices and escape pixels.

Palette Predictor Initialization

In SCM-4.0 a global palette predictor set is signaled in PPS. Instead of resetting the palette prediction state, which includes PredictorPaletteSize, PreviousPaletteSize and PredictorPaletteEntries, to all 0, values obtained from the PPS are instead used.

Palette Syntax

For a run of indices in the index map, there are several elements that need to be signaled, including:

1) Run type: either it is a copy above run or a copy index run.
2) Palette index: in a copy index run, it is used to signal what index is used for this run.
3) Run length: the length of this run for both copy above and copy index type.
4) Escape pixel: if there N (N>=1) escape pixels in the run, the N pixel values need to be signaled for these N escape pixels.

In JCTVC-T0065 (Karczewicz, et al., *Non CE1: Grouping Palette Indices At Front*, Joint Collaborative Team on Video Coding (JCT-VC) of ITU-T SG 16 WP 3 and ISO/IEC JTC 1/SC 29/WG 11, 20th Meeting: Geneva, C H, 10-18 Feb. 2015, Document: JCTVC-T0065), a syntax signaling is disclosed, where all the palette indices are grouped together. The number of palette indices is signaled first, following by the palette indices, as shown in Table 1.

TABLE 1

| | Note |
|---|---|
| palette_coding( x0, y0, nCbS ) {<br>  ...<br>  if( indexMax > 0) {<br>    palette_transpose_flag<br>    palette_num_indices<br>    for( i = 0; i < palette_num_indices; i++ )<br>      palette_index_idc<br>    last_palette_run_type_flag<br>    NumIndicesLeft = palette_num_indices<br>  }<br>  scanPos = 0<br>  while( scanPos < nCbS * nCbS ) {<br>    ... | |

TABLE 1-continued

Note

```
            if( indexMax > 0 && scanPos > = nCbS &&
                    palette_run_type_flag[ xcPrev ][ ycPrev ]
                    ! = COPY_ABOVE_MODE && NumIndicesLeft &&
                    scanPos < nCbS * nCbS - 1) {
                palette_run_type_flag[ xC ][ yC ]
            }
            if( palette_run_type_flag[ xC ][ yC ] = = COPY_INDEX_MODE &&
                    adjustedIndexMax > 0)
                NumIndicesLeft -= 1
            if( indexMax > 0 && (NumIndicesLeft | | palette_run_type_flag !=
                    last_palette_run_type_flag)) {
                maxPaletteRun = nCbS * nCbS - scanPos - NumIndicesLeft - 1
            ...
        }
}
```

As shown in the above syntax table, the maximum palette run is derived to limit the maximum codeword of palette run. It is desirable to reduce the maximum palette run based on coding information related to the block to improve coding efficiency.

BRIEF SUMMARY OF THE INVENTION

A method and apparatus of video coding using palette coding mode including run modes are disclosed. In one embodiment, the system determines a maximum palette run for a current pixel being coded based on coding information including whether a last run type for the current block is the copy-index mode or the copy-above mode. In another embodiment, the coding information for determining the maximum palette run further includes block size of the current block and pixel location of the current pixel. The current run associated with the current pixel is then encoded into one or more binary strings or decoded from the bitstream according to the maximum palette run. A syntax element to indicate the last run type for the current block can be signaled or parsed from the bitstream.

The system may derive a number of remaining palette indices for the current block at the pixel location of the current pixel and include the number of remaining palette indices in the coding information. In one example, the maximum palette run can be determined according to (nCbS*nCbS−scanPos−NumIndicesLeft−last_palette_run_type_flag−1), where nCbS represents the block width and height, scanPos represents the pixel location of the current pixel, NumIndicesLeft represents the number of remaining palette indices, the syntax element last_palette_run_type_flag has a value of 1 if the last run type is the copy-above mode and last_palette_run_type_flag has a value of 0 if the last run type is the copy-index mode. In one example, the maximum palette run can be determined according to (nCbS*nCbS−scanPos−(last_palette_run_type_flag==the copy-index mode?0:1)−1) or (nCbS*nCbS−scanPos−(last_palette_run_type_flag==the copy-above mode?1:0)−1).

In yet another example, if the number of remaining palette indices is greater than 0, the maximum palette run is determined according to (nCbS*nCbS−scanPos−last_palette_run_type_flag−2), (nCbS*nCbS−scanPos−(last_palette_run_type_flag==the copy-index mode?0:1)−2) or (nCbS*nCbS−scanPos−(last_palette_run_type_flag==the copy-above mode?1:0)−2).

In another embodiment, the number of copy-index modes and the number of the copy-above modes for the current block are signaled or parsed before the run type group and the run length group of the current block in the bitstream for the current block. The number of remaining copy-index modes is derived based on the number of the copy-index modes. The number of remaining copy-above modes is derived based on the number of the copy-above modes. The maximum palette run for a current pixel being coded is derived based on coding information including the number of remaining copy-index modes and the number of remaining copy-above modes for the current pixel. In another embodiment, the coding information further includes block size of the current block and pixel location of the current pixel. In one example, the maximum palette run for the current pixel is determined according to (nCbS*nCbS−scanPos−1−the number of remaining copy-index modes−the number of remaining copy-above modes). In another example, if both of the number of remaining copy-index modes and the number of remaining copy-above modes are greater than 0, the maximum palette run for the current pixel is determined according to (nCbS*nCbS−scanPos−3). If one of the number of remaining copy-index modes and the number of remaining copy-above modes is greater than 0 and another is equal to 0, the maximum palette run for the current pixel is determined according to (nCbS*nCbS−scanPos−2). If none of the number of remaining copy-index modes and the number of remaining copy-above modes is greater than 0, the maximum palette run for the current pixel is determined according to (nCbS*nCbS−scanPos−1).

BRIEF DESCRIPTION OF THE DRAWINGS

FIG. 2 illustrates an example of prediction across a CU by signaling a syntax element, pixel_num (M) to indicate that the first M (i.e., M=11) samples are predicted from the reconstructed pixels.

DETAILED DESCRIPTION OF THE INVENTION

Figure 1:
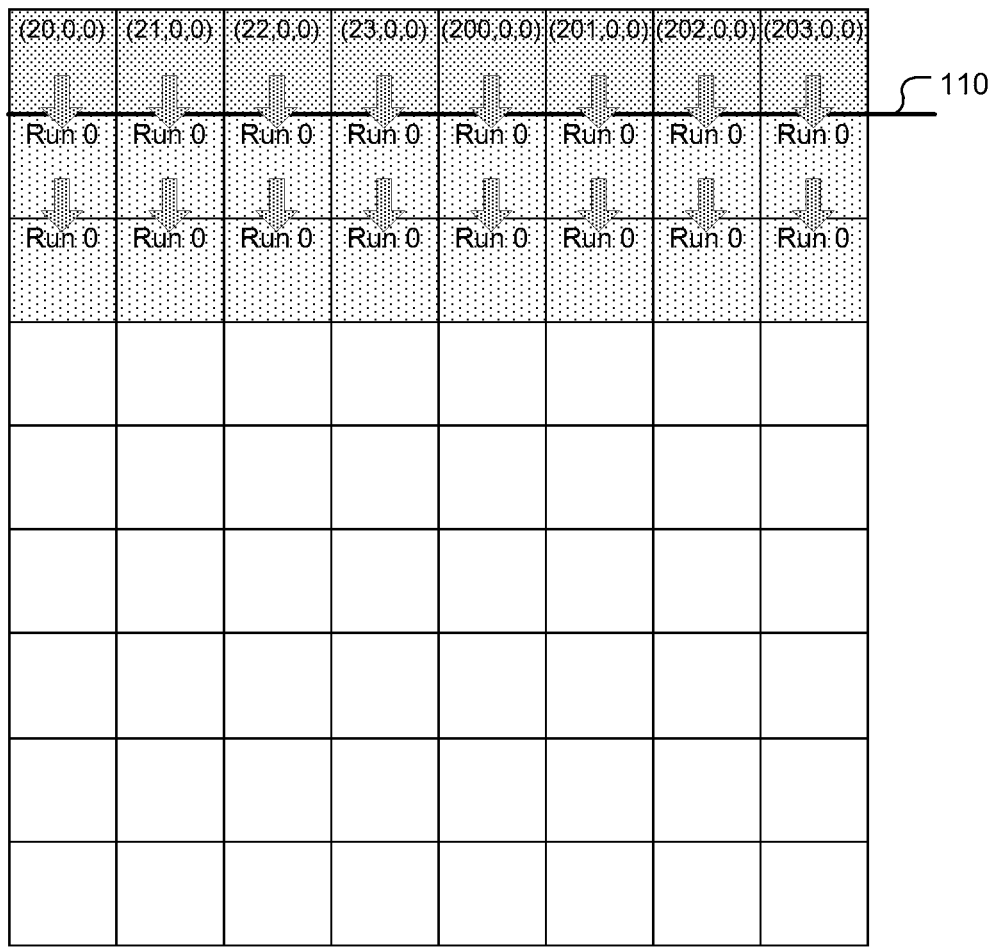
FIG. 1 illustrates an example of extended copy-above run mode, where two lines of pixels (i.e., L=2) are copied from an above line that is located above the CU boundary.

The following description is of the best-contemplated mode of carrying out the invention. This description is made for the purpose of illustrating the general principles of the invention and should not be taken in a limiting sense. The scope of the invention is best determined by reference to the appended claims.

Palette Run Coding

In order to improve the syntax parsing and/or coding efficiency, a method to group all palette indices before the syntax elements of palette run type and palette run length is disclosed in a co-pending PCT Patent Application (Serial No. PCT/CN2015/094410, filed on Nov. 12, 2015) by some common inventors of the present application. The "number of indices" is signaled, and a flag is used to indicate whether the last run type is COPY_ABOVE or COPY_INDEX. With the number of indices and the last run type identified, the last run can be detected and there is no need to signal this last run. At the decoder side, the length can be derived to reach to the end of the block (e.g., the palette coded CU) without the need to parse the last run.

The order of palette syntax signaling according to method disclosed in another co-pending PCT Patent application (Serial No. PCT/CN2016/073289, filed on Feb. 3, 2016) by some of the common inventors of the present application is as below:

"number of palette indices→palette index group→last_run_type"→{run_type, run_length} pair interleaved→Escape value group Furthermore, in the co-pending PCT Patent Application (Serial No. PCT/CN2015/094410, filed on Nov. 12, 2015) by some common inventors of the present application, the coding of all run type and all run length are grouped together, which can be combined with other syntax element grouping e related to index map coding.

In SCM-4.0, the palette indices are grouped at front and the escape values are group at the end within the bitstream for each coded block. Syntax last_palette_run_type_flag is signaled to indicate whether the last run type is the copy above mode (COPY_ABOVE_MODE) or the copy index mode (COPY_INDEX_MODE). The palette run mode and palette run pairs are coded after the index group. When coding the palette run, the maximum available run (also referred to as the maximum palette run) is derived to limit the maximum codeword of palette run. In SCM-4.0, the number of index_run modes remaining can be derived and each index_run mode signaled corresponds to at least one pixel signaled in the bitstream. Therefore, the maximum available run, maxPaletteRun can be determined as follows:

$$\text{maxPaletteRun} = nCbS \ast nCbS - \text{scanPos} - \text{NumIndicesLeft} - 1. \quad (1)$$

In equation (1), scanPos is the current position in scan order and NumIndicesLeft is the number of remaining indices up to the current position, nCbS represents block width and height, and NumIndicesLeft represents the number of remaining palette indices.

In an embodiment, when the NumIndicesLeft is greater than 0, the maxPaletteRun can be modified as shown in equation (2).

if (NumIndicesLeft)

$$\text{maxPaletteRun} = nCbS \ast nCbS - \text{scanPos} - 2 \quad (2)$$

In SCM-4.0, the last_palette_run_type_flag is also signaled before the palette run. If the last_palette_run_type_flag is equal to 1, it indicates that the last run type is copy_above_mode. The last copy_above_mode corresponds to at least one pixel signaled in the bitstream. Therefore, the maximum available run is modified according to one embodiment as:

$$\text{maxPaletteRun} = nCbS \ast nCbS - \text{scanPos} - \text{NumIndicesLeft} - \text{last\_palette\_run\_type\_flag} - 1, \quad (3)$$

$$\text{maxPaletteRun} = nCbS \ast nCbS - \text{scanPos} - \text{NumIndicesLeft} - (\text{last\_palette\_run\_type\_flag} == \text{COPY\_INDEX\_MODE?0:1}) - 1, \quad (4)$$

or $$\text{maxPaletteRun} = nCbS \ast nCbS - \text{scanPos} - \text{NumIndicesLeft} - (\text{last\_palette\_run\_type\_flag} == \text{COPY\_ABOVE\_MODE?1:0}) - 1. \quad (5)$$

In the above embodiment, the examples in equations (3) to (5) show three alternative syntax representations that lead to the same result. In the above equations, the logic operation (x? y:z) has the following meaning: if x is TRUE or not equal to 0, evaluates to the value of y; otherwise, evaluates to the value of z.

In another embodiment, when the NumIndicesLeft is greater than 0, the maxPaletteRun can be reduce according to the value of last_palette_run_type_flag. Examples according to this embodiment are shown as follows:

if (NumIndicesLeft)

$$\text{maxPaletteRun} = nCbS \ast nCbS - \text{scanPos} - \text{last\_palette\_run\_type\_flag} - 2, \quad (6)$$

or if (NumIndicesLeft)

$$\text{maxPaletteRun} = nCbS \ast nCbS - \text{scanPos} - (\text{last\_palette\_run\_type\_flag} == \text{COPY\_INDEX\_MODE?0:1}) - 2, \quad (7)$$

or if (NumIndicesLeft)

$$\text{maxPaletteRun} = nCbS \ast nCbS - \text{scanPos} - (\text{last\_palette\_run\_type\_flag} == \text{COPY\_ABOVE\_MODE?1:0}) - 2 \quad (8)$$

In the above embodiment, the examples in equations (6) to (8) show three alternative syntax representations that lead to the same result.

In other embodiment, the syntax order may be changed. For example, the palette run type group can be signaled before the palette runs. Furthermore, the number of the copy above modes (i.e., copy_above_run) and/or the number of the copy index modes (i.e., index run) can be signaled before the run type group and the run length group. An exemplary syntax order can be: number of copy_above_run or number of index_run→palette index group→last_run_mode→run type group→run length group→escape value group. When coding the palette run, the maximum available run can be subtracted by the number of rest of known modes. For example, maxPaletteRun=nCbS*nCbS−scanPos−1−number of remaining COPY_ABOVE_MODE−number of remaining COPY_INDEX_MODE.

In another embodiment, if the number of remaining COPY_ABOVE_MODE and the number of remaining COPY_INDEX_MODE are both greater than 0, the maxPaletteRun=$nCbS*nCbS$−scanPos−3, (9)

else if the number of remaining COPY_ABOVE_MODE>0 and the number of remaining COPY_INDEX_MODE==0, the maxPaletteRun=$nCbS*nCbS$−scanPos−2, (10)

else if the number of rest COPY_ABOVE_MODE==0 and the number of remaining COPY_INDEX_MODE>0, the maxPaletteRun=$nCbS*nCbS$−scanPos−2, (11)

otherwise, maxPaletteRun=$nCbS*nCbS$−scanPos−1. (12)

Prediction Across a CU

In order to further improve coding efficiency for palette prediction across a CU boundary, a special run is disclosed. This special run extends the copy-above run that starts from the first sample of a palette coded CU. The special run can be signaled once. The samples in the extended copy-above run mode are predicted from the reconstructed pixels in the neighboring CU. The remaining samples in this CU are coded using the palette syntax specified in SCM-4.0, except that the total palette coded samples in a PU/CU are reduced.

Embodiment 1

A syntax element (e.g. line_num represented by L) is first signaled to indicate that the first L lines of samples are predicted from the reconstructed pixels in the neighboring CU, where L is a positive integer. The remaining samples are coded using the palette syntax in SCM-4.0, except that the total palette coded samples in a PU/CU are reduced. For the first L lines of samples, their pixel values are predicted from the reconstructed pixels in the neighboring CU. For example, if palette_transpose_flag is 0, the reconstructed pixels in the above CUs are used. The pixel values of the first L lines of samples are the reconstructed pixel values of the last row of the above CUs. It is similar to applying the Intra vertical prediction to the first L lines of samples, while the remaining lines are coded with normal palette mode.

FIG. 1 illustrates an example of extended copy-above run mode, where two lines of pixels (i.e., L=2) are copied from an above line that is located above the CU boundary 110.

Embodiment 2

Figure 2:
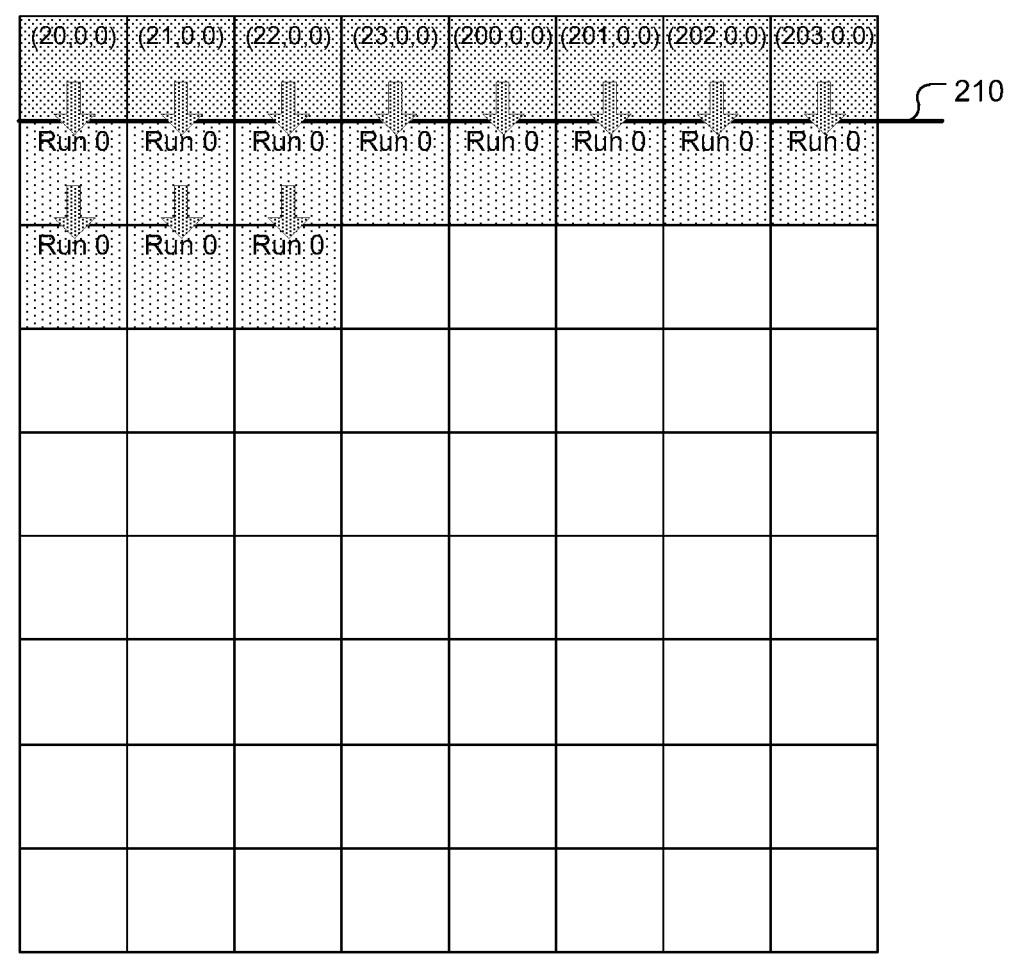

A syntax element (e.g. pixel_num represented M) is first signaled to indicate that the first M samples are predicted from the reconstructed pixels in the neighboring CU, where M is a positive integer. The remaining samples are coded using the palette syntax in SCM-4.0, except that the total palette coded samples in a PU/CU are reduced. For example, if palette_transpose_flag is 0, the reconstructed pixels in the above CUs are used. The pixel values of the first M samples are the reconstructed pixel values of the last row of the above CUs. It is similar to applying the Intra vertical prediction to the first M samples. If the width of CU is CU_width, the first CU_width samples starting from the first sample at (M+1) through the (M+CU_width-)-the sample in the CU cannot be coded in the copy-above run mode according to the syntax in SCM-4.0. In other words, the samples with the scan position equal to M through (M+CU_width−1) cannot be coded in the copy-above run mode according to the syntax in SCM-4.0. FIG. 2 illustrates an example of prediction across a CU boundary 210 by signaling a syntax element, pixel_num (M) to indicate that the first M (i.e., M=11) samples are predicted from the reconstructed pixels.

For example, the syntax table for palette_coding in SCM-4.0 can be modified as shown in Table 2.

TABLE 2

| | Note |
|---|---|
| palette_coding( x0, y0, nCbS ) { | |
| ... | |
| if( indexMax > 0) | |
| palette_transpose_flag | |
| pixel_num | (2-1) |
| scanPos = pixel_num | (2-2) |
| while( scanPos < nCbS * nCbS ) { | |
| xC = x0 + travScan[ scanPos ][ 0 ] | |
| yC = y0 + travScan[ scanPos ][ 1 ] | |
| if( scanPos > pixel_num) { | (2-3) |
| xcPrev = x0 + travScan[ scanPos − 1 ][ 0 ] | |
| ycPrev = y0 + travScan[ scanPos − 1 ][ 1 ] | |
| } | |
| if( indexMax > 0 && scanPos > = nCbS + pixel_num | (2-4) |
| && | |
| palette_run_type_flag[ xcPrev ][ ycPrev ] ! = | |
| COPY_ABOVE_MODE ) { | |
| palette_run_type_flag[ xC ][ yC ] | |
| } | |
| ... | |
| scanPos++ | |
| } | |
| } | |

As shown in Table 2, syntax element pixel_num is incorporated as indicated by Note (2-1), where the pixel_num is signaled before the palette index map coding. The rest palette samples are coded from the scan position starting from pixel_num as indicated by Note (2-2). The previous palette sample position is derived according to Note (2-3). The copy-above mode is not allowed for the first sample row after the first pixel_num samples as indicated by Note (2-4).

The variable adjustedIndexMax representing the adjusted maximum index is derived as follows:

adjustedIndexMax = indexMax
if( scanPos > pixel_num )
    adjustedIndexMax − = 1

The variable adjustedRefIndexMax representing the adjusted maximum reference index is derived as follows:

adjustedRefIndex = indexMax + 1
if( scanPos > pixel_num ) {
    if( palette_run_type_flag[xcPrev][ycPrev] !=
    COPY_ABOVE_MODE )
        adjustedRefIndex = PaletteIndexMap[xcPrev][ycPrev]
    else
        adjustedRefIndex = PaletteIndexMap[xC][yC − 1]

In Embodiment 1 and Embodiment 2 mentioned above, a syntax element, copy_from_neighbouring_CU_flag can be signaled first. If the copy_from_neighbouring_CU_flag is 0, the line_num and pixel_num are not signaled and can be inferred as 0. If the copy_from_neighbouring_CU_flag is 1, the line_num and pixel_num are signaled. The actual line_num and pixel_num equal to the parsed line_num and pixel_num increased by 1.

Palette Index Map Coding for Combined Copy Index/Pixel for First Row and Signaling Index Group in Front When the copy above index/pixel for the first row as described in JCTVC-T0036 (JCTVC-T0036: Sun, et al., *CE1: Tests A.1: Extended copy above mode to the first line* (1.1-1.5), Joint Collaborative Team on Video Coding (JCT-VC) of ITU-T SG 16 WP 3 and ISO/IEC JTC 1/SC 29/WG 11, 20th Meeting: Geneva, C H, 10-18 Feb. 2015, Document: JCTVC-T0036) is applied, the partial redundant index removal is required. The adjustedIndexMax depends on the previous coded palette run mode and whether the above sample is copied from neighboring CU. However, in the method of moving index group in front as described in JCTVC-T0065, the adjustedIndexMax is always a fixed value except for the first index. In order to solve this conflict, the derivation of adjustedRefIndex is modified as follows.

Embodiment 1: No Change to adjustedIndexMax

In this embodiment, the adjustedIndexMax is always fixed to indexMax. The index redundancy removal is still applied except when the previous coded run type is the copy above mode (i.e., COPY_ABOVE_MODE) and the above sample is copied from the neighboring CU. The variable adjustedRefIndex is derived as follows:

```
adjustedRefIndex = indexMax + 1
if( scanPos > 0 ) {
    if( palette_run_type_flag[xcPrev][ycPrev] !=
       COPY_ABOVE_MODE )
        adjustedRefIndex = PaletteIndexMap[xcPrev][ycPrev]
    else if(scanPos >= nCbS && PaletteIndexMap[xC][yC - 1]!=
       copy_pixel_from_neighbouring_CU)
        adjustedRefIndex = PaletteIndexMap[xC][yC - 1]
```

As shown in the above pseudo codes, a test condition "PaletteIndexMap[xC][yC-1]!=copy_pixel_from_neighbouring_CU" corresponding to the previous coded run type being COPY_ABOVE_MODE is included so that index redundancy removal will not be applied to the case of the previous coded run type being the copy above mode (i.e., COPY_ABOVE_MODE) and the above sample being copied from the neighboring CU.

Embodiment 2: Inserting an Additional Index for copy_pixel_from_neighbouring_CU

In this embodiment, a special index is inserted to indicate that the sample is copied from the neighboring CU. This special index (e.g., copy_pixel_index) can have an index value corresponding to 0, equal to currentPaletteSize (i.e., escape_index-1), or equal to currentPaletteSize+1. If the copy_pixel_index is equal to 0 or currentPaletteSize, the escape index is set equal to currentPaletteSize+1. If the copy pixel index is equal to currentPaletteSize+1, the escape index is set to currentPaletteSize.

The adjustedIndexMax is always fixed to indexMax, which is set to the currentPaletteSize if palette_escape_val_present_flag is equal to 1, and indexMax is set to the (currentPaletteSize-1) if palette_escape_val_present_flag is equal to 0. The index redundancy removal is applied to all samples. The variable adjustedRefIndex is derived as follows:

```
adjustedRefIndex = copy_pixel_index
if( scanPos > 0 ) {
    if( palette_run_type_flag[xcPrev][ycPrev] !=
       COPY_ABOVE_MODE )
        adjustedRefIndex = PaletteIndexMap[xcPrev][ycPrev]
    else if(yC == 0)
        adjustedRefIndex = copy_pixel_index
    else
        adjustedRefIndex = PaletteIndexMap[xC][yC - 1]
```

Figure 3:
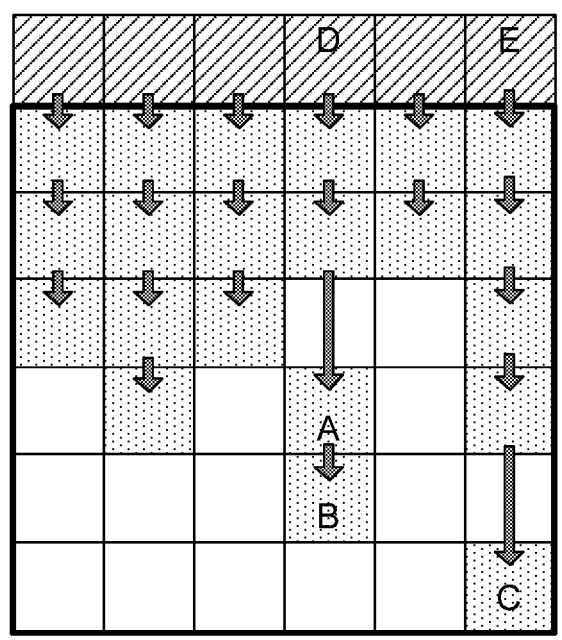
FIG. 3 illustrates an example of inserting an additional index for copy_pixel_from_neighboring_CU according to an embodiment of the present invention.

If the index of the first sample is equal to copy_pixel_index, the first sample is forced to use the copy_above_mode. If the reconstructed index is equal to copy_pixel_index, its pixel value is copied from the neighboring CU. For example, in FIG. 3, the dot-filled pixels correspond to samples with an index equal to copy_pixel_index. For samples A and B, their pixel values are equal to the pixel value of sample D. For sample C, its pixel value is equal to the pixel value of sample E.

Palette Syntax Grouping

In SCM-4.0, the palette indices are grouped at front and the escape values are group at the end among various types of syntax elements. The palette indices and the escape values are both coded with bypass bins. Grouping the escape values with the palette indices (i.e. grouping bypass coded bins) may increase the parsing throughput. In SCM-4.0, the total number of escape values be parsed depends on the palette run mode, palette index and palette run. Therefore, the escape values can only be grouped at the end. In order to group the escape values with palette indices, several embodiments are proposed.

When the escape values are grouped at front, the number of escape values that need to be parsed should be independent of the palette runs. For escape value parsing, in order to remove the data dependency on the palette runs, the copy above run mode process is modified for copying escape samples from the above row.

In the copy above run mode, a value "palette run" is transmitted or derived to indicate the number of following samples being copied from the above row. The color indices are equal to the color indices in the above row. According to one embodiment, if the above or left sample is an escape sample, the color index of the above sample is treated as a predefined color index (e.g. 0). The current index is set to the predefined index and no escape value is required in these predictor copy modes. According to this embodiment, the palette run can be signaled for index run mode even if the signaled index is equal to the escape index. If the run for the escape index is larger than 0 (e.g. N), the first sample is reconstructed with the coded escape value. The index of the first sample can be set to the escape index or the predefined color index. The index of the remaining N samples is set to the predefined index (e.g. index 0), and the remaining N samples are reconstructed with value of the predefined index (e.g. index 0). According to this embodiment, the max codeword index in the run mode (i.e., adjustedIndexMax) is fixed (e.g. indexMax-1) except for the first sample of the index run mode. For the first sample in the CU, the adjustedIndexMax is equal to indexMax.

The redundant index removal can be still applied. The number of escape values that need to be parsed depends on the number of parsed/reconstructed indices having the escape index. For example, if the palette indices are coded with truncated binary code and the coded bins are all ones, the pared index is the escape index. The number of escape values to be parsed is independent of palette runs. Therefore, the syntax of escape values can be brought in the front (before the palette runs) with palette indices.

According to this embodiment, if the currentPaletteSize is equal to 0, which means all samples are coded as escape index, the first palette index is inferred as 0 (i.e., the escape index) and the palette run is inferred as nCbS*nCbS−1. In other words, all samples are coded as escape index. The escape values of (nCbS*nCbS) samples are signaled. In this condition, it doesn't need to treat the remaining nCbS*nCbS−1 samples as the predefined index.

Figure 4:
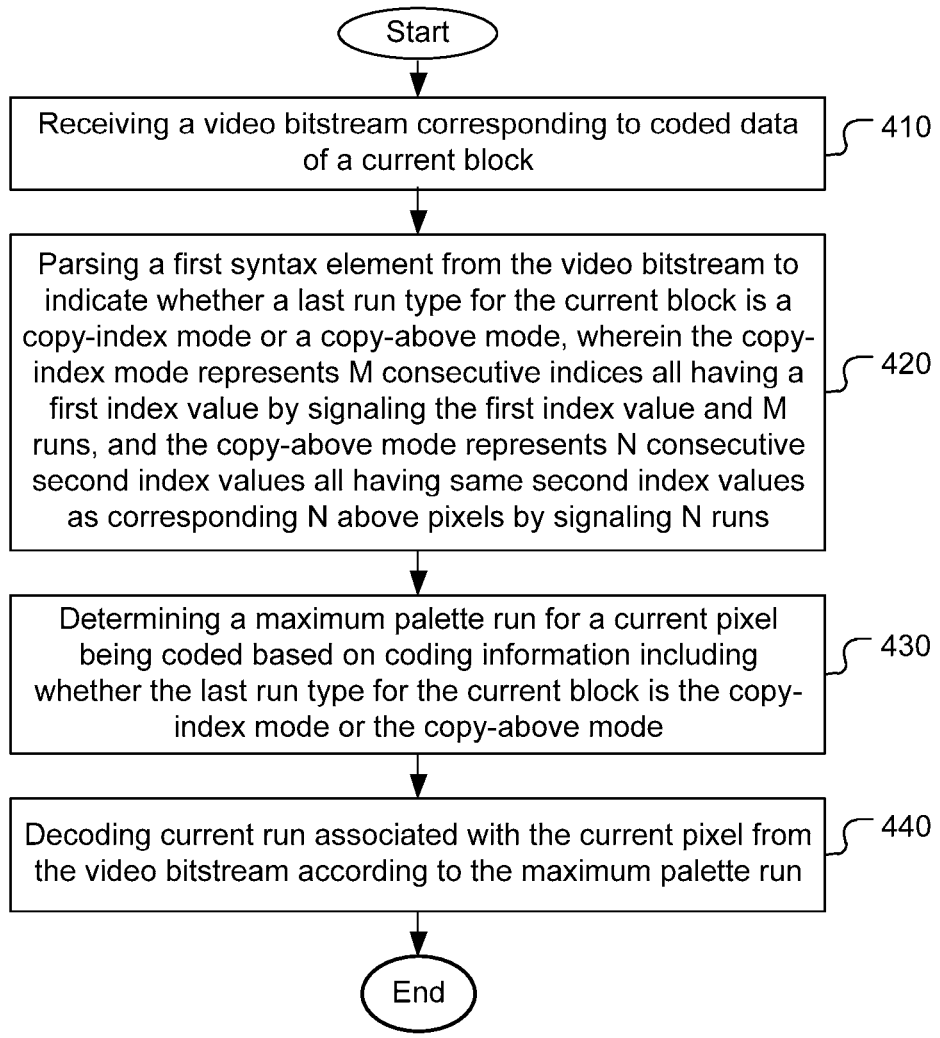
FIG. 4 illustrates an exemplary flowchart of a video decoder using the palette coding mode incorporating an embodiment of the present invention.

FIG. 4 illustrates an exemplary flowchart of a video decoder using the palette coding mode incorporating an embodiment of the present invention. The system receives a video bitstream corresponding to coded data of a current block in step 410. The system parses a first syntax element from the video bitstream to indicate whether a last run type for the current block is a copy-index mode or a copy-above mode in step 420. The copy-index mode represents M consecutive indices all having a first index value by signaling the first index value and M runs, and the copy-above mode represents N consecutive second index values all having same second index values as corresponding N above pixels by signaling N runs. The system then determines the maximum palette run for a current pixel being coded based on coding information including whether the last run type for the current block is the copy-index mode or the copy-above mode in step 430. The system decodes the current run associated with the current pixel from the video bitstream according to the maximum palette run in step 440.

Figure 5:
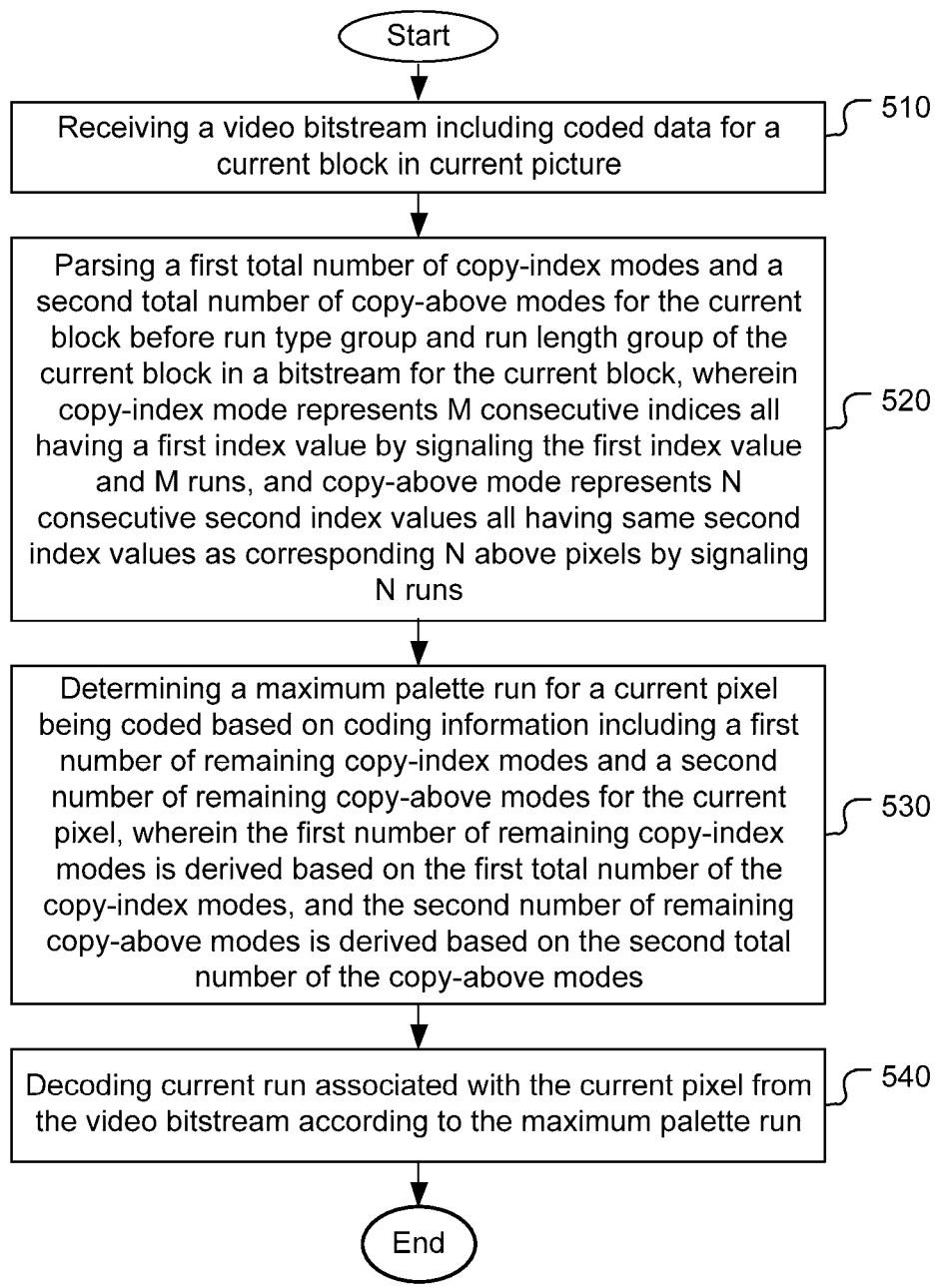
FIG. 5 illustrates an exemplary flowchart of a video decoder using the palette coding mode incorporating another embodiment of the present invention.

FIG. 5 illustrates an exemplary flowchart of a video decoder using the palette coding mode incorporating another embodiment of the present invention. The system receives a video bitstream corresponding to coded data of a current block in step 510. The system parses a first total number of copy-index modes and a second total number of copy-above modes for the current block before run type group and run length group of the current block in a bitstream for the current block in step 520. The copy-index mode represents M consecutive indices all having a first index value by signaling the first index value and M runs, and copy-above mode represents N consecutive second index values all having same second index values as corresponding N above pixels by signaling N runs. The system then determines a maximum palette run for a current pixel being coded based on coding information including a first number of remaining copy-index modes and a second number of remaining copy-above modes for the current pixel in step 530. The first number of remaining copy-index modes is derived based on the first total number of the copy-index modes, and the second number of remaining copy-above modes is derived based on the second total number of the copy-above modes. The system decodes the current run associated with the current pixel from the video bitstream according to the maximum palette run in step 540.

The flowcharts shown are intended to illustrate an example of video decoding using palette coding mode according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video or image decoding using a palette coding mode, the method comprising:
receiving a bitstream corresponding to coded data of a current block of a current picture;
parsing a first syntax element from the bitstream to identify whether a last run type for the current block is a copy-index mode or a copy-above mode, wherein the copy-index mode represents M consecutive indices all having a first index value by signaling the first index value and a first nm number corresponding to M, and the copy-above mode represents N consecutive second index values all having same second index values as corresponding N above pixels by signaling a second run number corresponding to N;
calculating a maximum palette run for a current pixel according to an equation for the maximum palette run, the equation having an expression of $$maxPaletteRun = nCbS*nCbS - scanPos - NumIndicesLeft - last\_palette\_run\_type\_flag - 1,$$

wherein maxPaletteRun represents the maximum palette run, nCbS represents a block width or a block height of the current block, scanPos represents a pixel location of the current pixel, NumIndicesLeft represents a number of remaining palette indices, and last_palette_run_type_flag represents the last run type, last_palette_run_type_flag having a value of 1 if the last run type is the copy-above mode and last_palette_run_type_flag having a value of 0 if the last run type is the copy-index mode;

decoding a current run number associated with the current pixel from a codeword that is included in the bitstream and has a format determined according to the calculated maximum palette run; and decoding the current block of the current picture using the palette coding mode according to the current run number.

2. An apparatus for video or image decoding using a palette coding mode, comprising a processor configured to:

receive a bitstream corresponding to coded data of a current block of a current picture;

parse a first syntax element from the bitstream to identify whether a last run type for the current block is a copy-index mode or a copy-above mode, wherein the copy-index mode represents M consecutive indices all having a first index value by signaling the first index value and a first run number corresponding to M, and the copy-above mode represents N consecutive second index values all having same second index values as corresponding N above pixels by signaling a second run number corresponding to N;

calculate a maximum palette run for a current pixel according to an equation for the maximum palette run, the equation having an expression of $$maxPaletteRun = nCbS*nCbS - scanPos - NumIndicesLeft - last\_palette\_run\_type\_flag - 1,$$

wherein maxPaletteRun represents the maximum palette run, nCbS represents a block width or a block height of the current block, scanPos represents a pixel location of the current pixel, NumIndicesLeft represents a number of remaining palette indices, and last_palette_run_type_flag represents the last run type, last_palette_run_type_flag having a value of 1 if the last run type is the copy-above mode and last_palette_run_type_flag having a value of 0 if the last run type is the copy-index mode;

decode a current run number associated with the current pixel from a codeword that is included in the bitstream and has a format determined according to the calculated maximum palette run; and decode the current block of the current picture using the palette coding mode according to the current run number.

3. A method of video or image coding using a palette coding mode, the method comprising:

encoding a current block of a current picture using the palette coding mode, including determining a current palette index map for the current block; and encoding the current palette index map into syntax elements to be included in a bitstream using palette index prediction modes including a copy-index mode and a copy-above mode, wherein the copy-index mode represents M consecutive indices all having a first index value by signaling the first index value and a first run number corresponding to M, and the copy-above mode represents N consecutive second index values all having same second index values as corresponding N above pixels by signaling a second run number corresponding to N, wherein the encoding the current palette index map includes:

calculating a maximum palette run for a current pixel according to an equation for the maximum palette run, the equation having an expression of $$maxPaletteRun = nCbS*nCbS - scanPos - NumIndicesLeft - last\_palette\_run\_type\_flag - 1,$$

wherein maxPaletteRun represents the maximum palette run, nCbS represents a block width or a block height of the current block, scanPos represents a pixel location of the current pixel, NumIndicesLeft represents a number of remaining palette indices, and last_palette_run_type_flag represents the last run type, last_palette_run_type_flag having a value of 1 if the last run type is the copy-above mode and last palette run type flag having a value of 0 if the last run type is the copy-index mode; and encoding a current run number associated with the current pixel into a codeword that is to be included in the bitstream and has a format determined according to the calculated maximum palette run.

4. The method of claim 3, further comprising generating a first syntax element of the syntax elements, the first syntax element indicating the last run type for the current block.

5. A method of video or image decoding using a palette coding mode, the method comprising:

receiving a bitstream corresponding to coded data of a current block of a current picture;

parsing the bitstream to obtain a first total number of applications of a copy-index mode and a second total number of applications of a copy-above mode for the current block, wherein the copy-index mode represents M consecutive indices all having a first index value by signaling the first index value and a first run number corresponding to M, and the copy-above mode represents N consecutive second index values all having same second index values as corresponding N above pixels by signaling a second run number corresponding to N;

determining a first number of remaining applications of the copy-index mode for a current pixel based on the first total number and determining a second number of remaining applications of the copy-above mode for the current pixel based on the second total number;

calculating a maximum palette run for the current pixel according to an equation for the maximum palette run, the equation including a subtraction by a subtrahend, the equation having an expression of $$maxPaletteRun = nCbS*nCbS - scanPos - 1 - \text{the subtrahend},$$

wherein maxPaletteRun represents the maximum palette run, nCbS represents a block width or a block height of the current block, scanPos represents a pixel location of the current pixel, and the subtrahend is
- three when the first number and the second number are greater than zero,
- two when only one of the first number and the second number is zero, and
- one when the first number and the second number are both zero;

decoding a current run number associated with the current pixel from a codeword that is included in the bitstream and has a format determined according to the calculated maximum palette run; and decoding the current block of the current picture using the palette coding mode according to the current run number.

6. A method of video or image coding using a palette coding mode, the method comprising:

encoding a current block of a current picture using the palette coding mode, including determining a current palette index map for the current block; and encoding the current palette index map into syntax elements to be included in a bitstream using palette index prediction modes including a copy-index mode and a copy-above mode, wherein the copy-index mode represents M consecutive indices all having a first index value by signaling the first index value and a first run number corresponding to M, and the copy-above mode represents N consecutive second index values all having same second index values as corresponding N above pixels by signaling a second run number corresponding to N, wherein the encoding the current palette index map includes:

determining a first total number of applications of the copy-index mode and a second total number of applications of the copy-above mode for the current block;

determining a first number of remaining applications of the copy-index mode for a current pixel based on the first total number and determining a second number of remaining applications of the copy-above mode for the current pixel based on the second total number;

calculating a maximum palette run for the current pixel according to an equation for the maximum palette run, the equation including a subtraction by a subtrahend, the equation having an expression of $$\text{maxPaletteRun} = nCbS * nCbS - \text{scanPos} - 1 - \text{the subtrahend},$$

wherein maxPaletteRun represents the maximum palette run, nCbS represents a block width or a block height of the current block, scanPos represents a pixel location of the current pixel, and the subtrahend is
- three when the first number and the second number are greater than zero,
- two when only one of the first number and the second number is zero, and
- one when the first number and the second number are both zero; and encoding a current run number associated with the current pixel into a codeword that is to be included in the bitstream and has a format determined according to the calculated maximum palette run.

* * * * *